Figure 1:
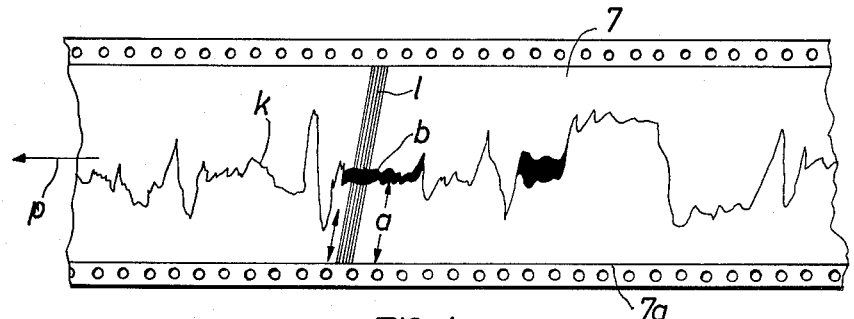

Jan. 19, 1965  H. DEDDEN ETAL  3,166,675
SCANNING TRACE CONVERTER
Filed Sept. 15, 1960  2 Sheets-Sheet 1

INVENTORS:
HUBERT DEDDEN, HEINRICH NASSENSTEIN, HELMUT STEUDEL.
BY
Burgess, Dinklage & Sprung
ATTORNEYS 3,166,675
SCANNING TRACE CONVERTER
Hubert Dedden, Leverkusen, Heinrich Nassenstein, Cologne-Stammheim, and Helmut Steudel, Leverkusen, Germany, assignors to Farbenfabriken Bayer Aktiengesellschaft, Leverkusen, Germany, a corporation of Germany
Filed Sept. 15, 1960, Ser. No. 56,322
5 Claims. (Cl. 250—219)

The invention relates to a method of planimetering using a mechanical or electronic flying-spot scanner, the data contained in the reflected impulses of light being evaluated electronically by means of a pulse circuit.

It is an object of the invention not only to measure an irregular area with a planimeter by means of this known method, but also to determine the area which lies between the centre line of an areal curve and the reference line of a recording strip. An areal curve frequently occurs in recording strips of recorders, as in energy diagrams for example, the curves often being smudged over up to 10% of the total width of the recording strip. The measurement of the area below the curve then involves a correspondingly great error. In order to avoid these errors, it would be necessary to measure, as the ordinate value, the distance which extends from the reference line to the particular centre of the curve, but this is impossible because no data obtainable by means of light impulses can be obtained from the centre of the areal curve.

It has now been found that these measuring difficulties are overcome if, according to the invention, the time pulses, the duration of which corresponds to the spacing of ordinate values in the area bounded by curves, are separated from one another by means of a combination of discriminators, flip-flop stages, coincidence stages, "gate" switches, and the oscillator-synchronized co-operation of these stages. In order to measure the distance from the reference line to the centre of the curve line, the time pulses of which the duration corresponds to the width of the curve line, are digitally scanned at half the frequency at which the time pulses of which the duration corresponds to the distance from the reference line to the centre of the curve line are digitally scanned, and the two resultant series of digital pulses are then added in a digital integrating device.

For example, the series of pulses obtained from the light information may be applied to a discriminator which separates the interference from the series of pulses which contains the following ordinate values of the distances by means of an adjustable level: reference line to curve line, width of curve line, curve line to full deflection and flyback pulse. The system then converts the series of pulses into two series of pulses which are phase-displaced by 180° in relation to one another, in a phase-inverter stage, differentiates the two series of pulses, supplies each of them to a bi-stable multi-vibrator, combines the four series of pulses obtained from the bi-stable multi-vibrators in pairs in "gate" switches, and supplies the pulses obtained therefrom, which correspond to the required ordinate values, to further "gate" switches which are controlled by digital pulse oscillators.

In order to measure the distance from the reference line to the centre of the curve line, for example, that "gate" switch which is controlled by that pulse which contains the width of the curve line, is digitally scanned at half the digital pulse frequency of the "gate" switch for the distance from the reference line to the curve line. The two resultant series of digital pulses from the two measurements are then added in a digital counter. In this manner half the width of the curve line is added to the distance from the reference line to the curve line.

Figure 2:
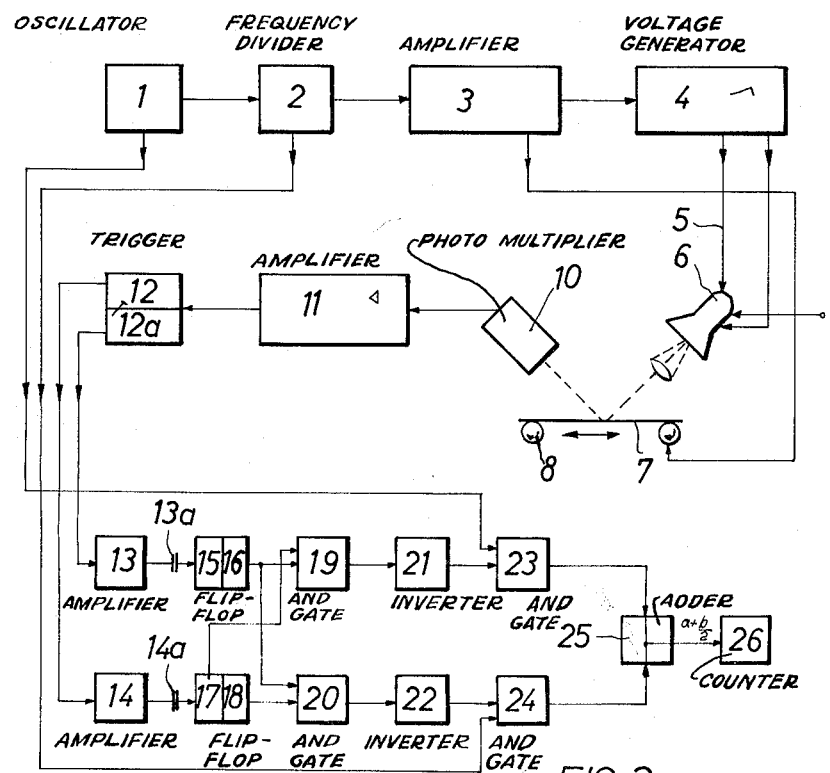
Figure 3:
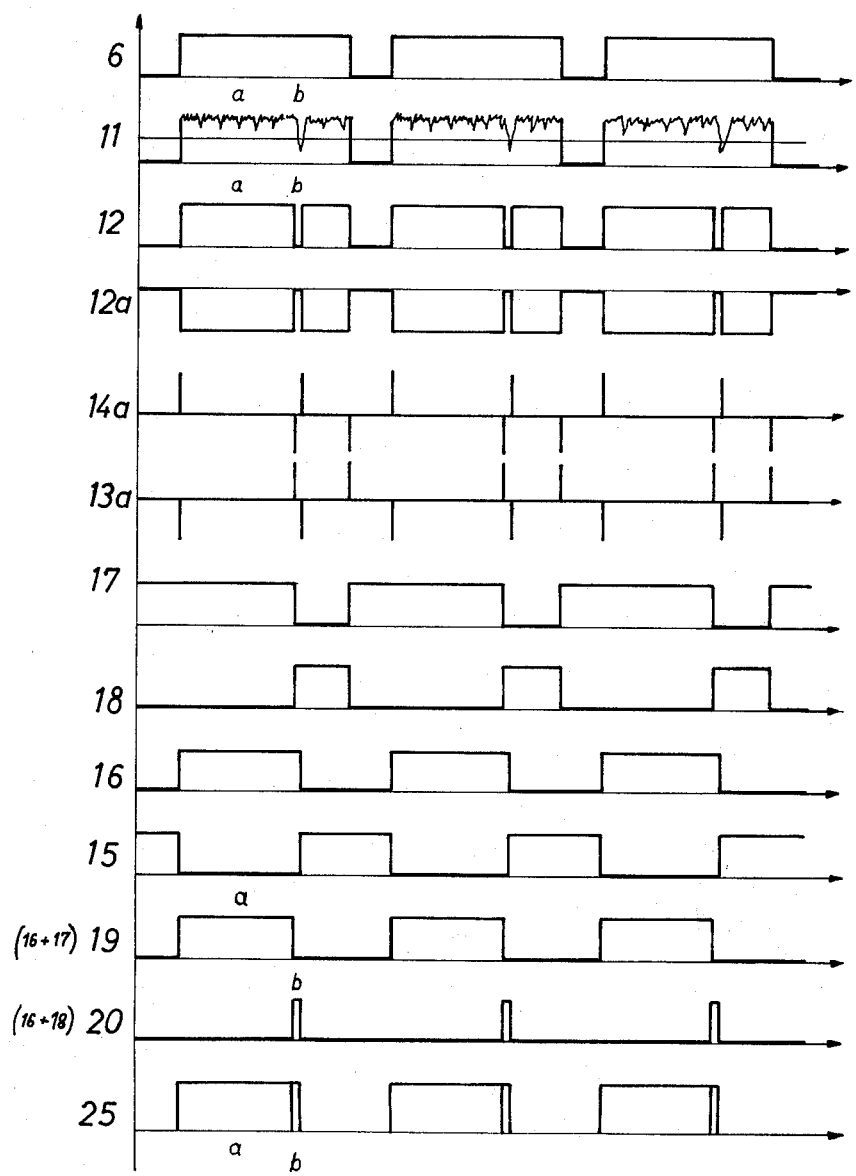

Examples of the invention are illustrated diagrammatically in the drawing. FIGURE 1 represents an area to be measured, for example a recording strip 7 of a measurement recorder. FIGURE 2 is a block circuit diagram of the electrical device with which the pulse data is evaluated. FIGURE 3 shows the pulse plan on which the electrical device of FIGURE 2 works.

In detail, in FIGURE 1, $a$ signifies the distance from the reference line $7a$ to the boundary of the curve line $k$, $b$ signifies the width of the curve line perpendicular to the reference line $7a$. The recording strip 7 is advanced at a constant speed in the direction of the arrow $p$, while the flying spot of the scanning device (see FIGURE 2) situated above the strip 7, moves at a constant speed over the whole width of the strip, transversely to the direction of advance of the strip 7. 1 is the path followed by the flying spot.

The flying spot illumination is provided by a conventional cathode ray tube 6 which is energized with a suitable sweep voltage through connection 5 from a sweep voltage generator 4. The sweep generator 4 and the drive rolls 8 for the strip 7 are both synchronized from an amplifier 3 in response to oscillator signals derived from a quartz oscillator 1 and transmitted through a frequency divider 2. The light impulses reflected by the strip 7 are converted into electrical pulses in a photo-multiplier 10, shown in FIGURE 2, and amplified in the amplifier 11. The time and amplitude data contained in the reflected light consists of the noise potential of the photo-multiplier, the interference in the light signal of the cathode-ray tubes, and the useless reflections from the paper of the recording strip (e.g. curve line). The useful signals are separated from the useless interference in a Schmitt trigger 12 and 12$a$ (see FIGURE 3, numeral 11). The steep square-wave pulses obtained (FIGURE 3), which contain the distances $a$ and $b$ (FIGURE 1), the dark interval of the flyback of the scanner and the total width of the scanned area, are therefore present with both positive and negative polarity. After amplification 13 and 14 (FIGURE 2), both pulse trains are differentiated in condensers 13$a$ and 14$a$ and each triggers a flip-flop stage 15, 16 and 17, 18 (FIGURE 2). The two flip-flop stages now supply four new pulse trains 15 and 16, 17 and 18 (FIGURE 3). Two pairs of these pulse trains are each supplied to an "AND" gate 19 or 20, and a fresh pulse train is obtained containing only one piece of information, for example 15 and 17 provides 19, namely the pulse the duration of which corresponds to the distance $a$, or 16 and 18 provides 20, namely the pulse the duration of which corresponds to the distance $b$. After reversal in stage 21 or 22 (FIGURE 2), the positive pulses $a$ and $b$ serve to control the two digitizing "AND" gates 23 and 24. The "gate" switch 24 is fed with digital conversion pulses from frequency divider pulse source 2 at half the frequency of the digital conversion pulses supplied from oscillator 1 to the "gate" switch 23. The gates 23 and 24 may be referred to hereinafter as "digitizers" or as "digitizing AND gates" because they have the effect of converting the relatively longer *a* and *b* pulses into bursts or separate series of higher frequency digital data pulses. The series of digital pulses obtained from 23 and 24 are digitally added in stage 25 (FIGURE 2) and represent, per scanning period, a measure of the distance ($a$ and $b/2$) and after the storage of all the scanning periods, a measure of the area below the centre of the curve line which was scanned with constant feed synchronized by the quartz-oscillator 1. If the scanning and the forward movement of the graph are effected at a constant speed and if one counting period is allocated to each unit area scanned by the flying spot, then the sum of all the counting pulses stored in an associated integrating device or counter 26 is proportional to the area below the recording curve. With this method it is also possible to measure areas which are not bounded by a straight reference line. For this purpose, only the pulse train 20 (FIGURE 3) is taken from the pulse circuit (FIGURE 2), and with it the "gate" switch 24 is controlled so that only those pulses, the number of which corresponds to the distance *b* are counted.

In addition, there are the following possible uses for the method: Conversion of analogue values into digital values (addition to calculating machines); programme transmitter for controlling operations; with the additional use of stores, calculating operations can be carried out with the distances and areas measured.

We claim:

1. A trace converter for providing a digital indication of the ordinates of a recorded marking, comprising scanning means for scanning a moving tape including detecting means for producing an electric signal when the scan intercepts a suitable marking on the tape, generating means operating at a predetermined frequency, frequency divider means triggered by said generating means, said frequency divider means being operable to generate pulses at one half of said predetermined frequency, means operable in response to said generating means for synchronizing said scanning means relative to the rate of movement of said tape, means associated with said generating means and said frequency divider means and controlled by said detecting means to transmit an output of a number of digital electric pulses from said generating means corresponding to the position of one edge of said marking in relation to a reference line on said tape and an output to transmit of a number of digital electric pulses from said frequency divider means corresponding to half the transverse width of said marking, and means for adding said electric pulses to produce a digital output for said trace converter corresponding to the instantaneous transverse medial position of said marking on said tape.

2. A trace converter for providing a digital indication of the ordinates of a graph, comprising scanning means for scanning a moving tape and a graph on said tape substantially perpendicular to the direction of movement of said tape, said scanning means including detecting means for producing an electric signal when the scan intercepts the line of said graph on said tape, a frequency generator operating at a predetermined frequency connected to operate a frequency divider to generate output pulses at half of said frequency, means for synchronizing said scanning means and said frequency generator to the rate of movement of said tape, means connected to said frequency generator and said frequency divider and controlled by said detecting means to transmit an output of a number of electric pulses from said frequency generator corresponding to the position of said graph on said tape and to transmit an output of a number of electric pulses from said frequency divider corresponding to half of the width of said line of said graph, and means for adding said electric pulses to produce a digital output for said trace converter corresponding to the position of the middle of said line in relation to the direction of said scan.

3. A scanning trace converter for scanning and recording numerical digital representations of data recorded as a curve line of variable width on a strip chart comprising means for repeatedly scanning the strip chart upon which the curve line is recorded and for generating pulses on separate signal channels respectively indicating the width of the curve line and the displacement from a reference line to the nearest edge of the curve line, a first digital pulse source operable at a first digital pulse frequency, a first AND gate means connected to receive pulses from said first digital pulse source as one input and connected to receive the pulse on said signal channel indicating displacement as the other input and operable in response thereto to emit an output of digital pulses proportionate in number to said curve line displacement, a second digital pulse source operable at a second digital pulse frequency which is one-half the digital pulse frequency of said first digital pulse source, a second AND gate means connected to receive pulses from said second digital pulse source as one input and connected to receive the pulse on the other one of said signal channels indicating curve line width as the other input and operable in response thereto to emit an output of digital pulses proportionate in number to one-half of the width of said curve line, and counting means operable to receive and add the output digital pulses from both of said AND gate means.

4. Apparatus for detecting and storing an accurately integrated measurement of data recorded on a chart in terms of a line of variable displacement and variable width comprising means for repeatedly scanning said chart and operable to generate a signal voltage wave for each scan having a first voltage level for light areas scanned and a second voltage level for dark areas scanned and for the flyback interval between scans, means connected to receive said voltage wave and including bistable circuits respectively operable to change state in response to a change in said scan signal voltage from said first voltage level to said second voltage level and from said second voltage level to said first voltage level, two AND gates each connected respectively to receive the two outputs from the same one of said bistable circuits as one of the inputs thereto, both of said AND circuits being connected to receive as the other inputs thereto the same one of the outputs from the other of said bistable circuits, said AND circuits being operable in response to said bistable circuit signals to generate signal pulses respectively proportional in duration to the scanned width of the data line and to the scanned displacement from a reference line to the edge of the data line, two digitizing AND gates respectively connected to receive said last-named pulses, a first source of digital pulses connected to the other input of the one of said digitizing AND gates which receives said displacement pulse, said last-named AND gate being operable to transmit a series of digital pulses proportional in number to said displacement for each scan, a second digital pulse source synchronized with said first pulse source and connected to provide the second input to the other of said digitizing AND gates at a frequency equal to one-half the frequency supplied by said first digital pulse source, said last-mentioned AND gate being operable to transmit a series of digital pulses proportional in number to one-half of the detected width of the data line for each scan, and means connected to receive and count in combination the digital output pulses from both of said digitizing AND gates to provide an accurate indication of the area between the reference line and the median of said data line.

5. A method of planimetering, comprising the steps of scanning a moving tape in a direction substantially transverse to the direction of movement of said tape, producing an electrical pulse having a relationship to the distance between a curve line on said tape and a reference line, producing an electrical pulse having a relationship to the transverse width of said curve line, digitizing said pulses by combining them with digital pulse signals, the pulse related to the transverse width of said curve being digitized at one half the digitizing frequency of the pulse related to said distance, and adding said digitized pulses to obtain a digital output representing the area between said reference line and the transverse medial line of said curve.

References Cited in the file of this patent

UNITED STATES PATENTS

| | | |
|---|---|---|
| 2,622,485 | Martellotti | Dec. 23, 1952 |
| 2,674,916 | Smith | Apr. 13, 1954 |
| 2,817,021 | Williams et al. | Dec. 17, 1957 |
| 2,961,547 | Snavely | Nov. 22, 1960 |
| 3,003,064 | Astheimer | Oct. 3, 1961 |
| 3,009,064 | Cook et al. | Nov. 14, 1961 |
| 3,033,990 | Johnson | May 8, 1962 |